United States Patent [19]
Adams, Jr. et al.

[11] Patent Number: 5,388,060
[45] Date of Patent: Feb. 7, 1995

[54] SIMULATED HOST COMPUTER/CHANNEL INTERFACE SYSTEM

[75] Inventors: James R. Adams, Jr., Westminster; Kenneth L. Howell, Broomfield, both of Colo.

[73] Assignee: Storage Technology Corporation, Louisville, Colo.

[21] Appl. No.: 991,358

[22] Filed: Dec. 15, 1992

[51] Int. Cl.[6] .............................................. G06F 15/60
[52] U.S. Cl. ...................... 364/579; 364/578; 364/DIG. 1; 364/238.3; 364/238.4; 395/425; 395/500; 371/16.2
[58] Field of Search ................ 364/579, 578, DIG. 1, 364/238.3, 238.4, 232.3; 371/16.2, 68.1, 68.3, 20; 395/275, 325, 500, 425

[56] References Cited

U.S. PATENT DOCUMENTS

| | | | |
|---|---|---|---|
| 4,127,896 | 11/1978 | Raslavsky, III | 364/DIG. 1 |
| 4,453,211 | 6/1984 | Askinazi et al. | 364/DIG. 1 |
| 4,455,654 | 6/1984 | Bhaskar et al. | 371/20 |
| 4,691,316 | 9/1987 | Phillips | 371/16.2 |
| 4,878,168 | 10/1989 | Johnson et al. | 364/DIG. 1 |
| 5,051,888 | 9/1991 | Hansen et al. | 364/DIG. 1 |
| 5,132,971 | 7/1992 | Oguma et al. | 371/16.2 |

OTHER PUBLICATIONS

Santoni; "Testers are getting better at finding microprocessor flaws", Electronics 1976.

*Primary Examiner*—Ellis B. Ramirez
*Attorney, Agent, or Firm*—Duft, Graziano & Forest

[57] ABSTRACT

A programmable channel emulator is disclosed which exercises a control unit to which it is attached to detect timing problems or error conditions in the control unit. A plurality of channel emulators can be concurrently operated in order to exercise the control unit in a multiple channel environment. The operation of the plurality of channel emulators is synchronized and controlled by a shared processor in order to emulate possible multiple channel situations that the channel control unit could encounter. Included in this system is a programmable delay circuit that operates under software control to provide a precisely controlled delay between receipt and transmission of signals between each emulator and a connected channel.

23 Claims, 10 Drawing Sheets

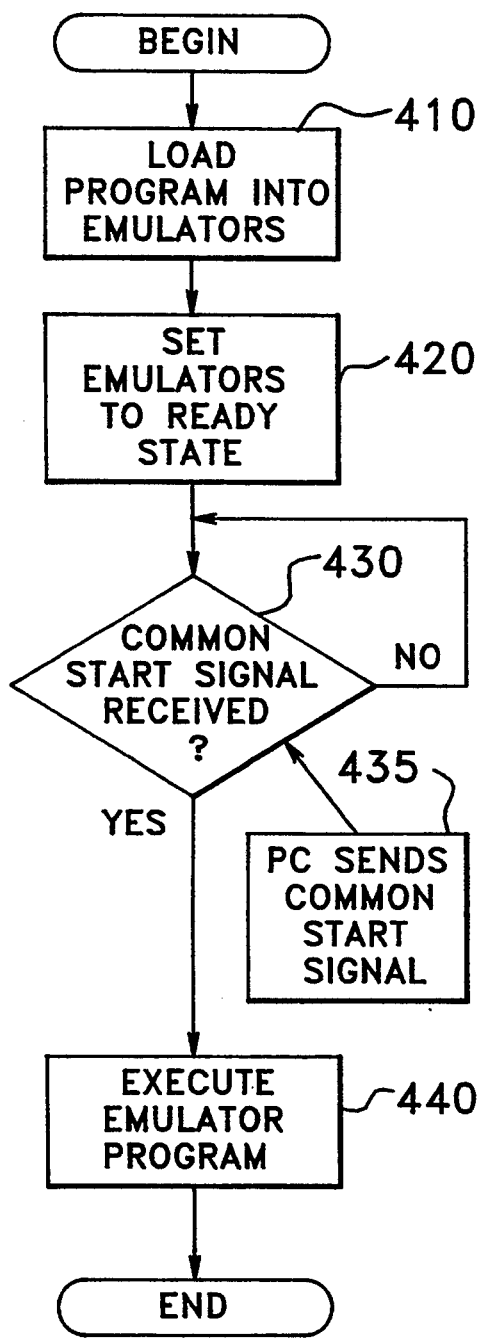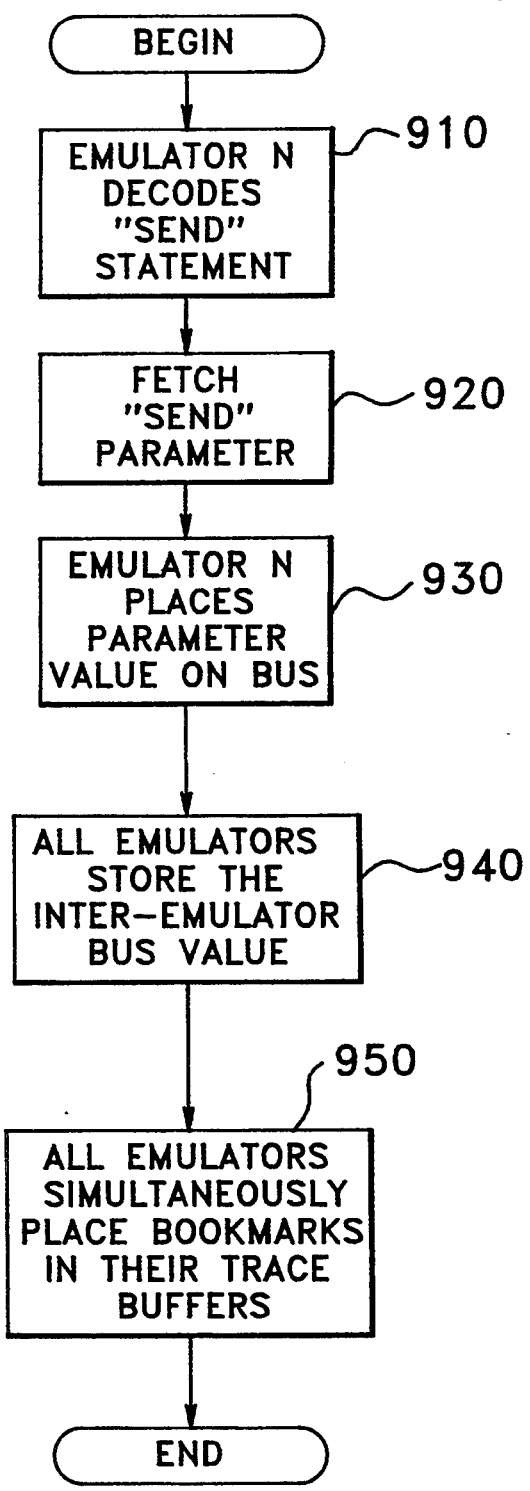
FIG.4.
FIG.9.

SIMULATED HOST COMPUTER/CHANNEL INTERFACE SYSTEM

FIELD OF THE INVENTION

This invention relates generally to data storage systems and, in particular, to a test system that simulates a host mainframe computer/channel interface, and which can be used to test the control unit that interconnects the channel with a plurality of data storage devices.

PROBLEM

It is a problem in the field of data storage systems to test the control unit that interconnects a host computer with a plurality of data storage devices such as magnetic tape drives or disk drives. The control unit is generally connected to a mainframe host processor by a channel interface. This channel interface comprises one or more channels which exchange control and data signals between the host processor and the control unit. The control unit functions to manage, in coordination with the host processor, the reading and writing of data between the data storage devices and the host processor. One difficulty with this configuration is that the testing of a control unit requires the active participation of the host processor. This burdens the host processor and is also limited in its effectiveness since the host processor operates in a regular fashion, producing signals having predetermined timing relative to one another. Therefore, in designing a new control unit, or testing a defective control unit or a newly manufactured control unit, a host processor is required to exercise the control unit. The variability of the conditions under which the control unit can be tested is severely limited due to the preprogrammed fixed nature of operation of the host processor and channel interface. There presently exists no effective way of testing control units in order to identify signal timing problems or marginal conditions in the operation of the control unit.

SOLUTION

The above described problems are solved and a technical advance achieved in the field by the simulated channel/control unit test system ("test system") of the present invention which is programmable to exercise a control unit to which it is attached to detect timing problems or error conditions in the control unit.

The test system is capable of employing a plurality of devices which can be concurrently operated in order to exercise the control unit in a simulated multiple channel environment. These devices are referred to as channel "emulators", because each of them provides the same functionality as a host processor channel. A multiple channel environment exists in the situation wherein a plurality of host processor channels are connected to the same control unit. In the present invention, the plurality of channel emulators are synchronized and controlled by a single shared processor in order to emulate any of the possible multiple channel situations that the control unit might encounter.

Included in this test system is programmable signal timing circuitry that operates under software control to provide precisely controlled timing between receipt and transmission of control signals between the test system and the control unit. In addition, the present test system can also precisely control the timing of the capture of data signals which are transferred between the control unit and the test system. The test system thus provides a means for identifying control unit signal timing problems and also provides signal timing scenarios heretofore unavailable to design and test engineers.

The test system provides a number of novel features which include:

(1) program control of timing between the receipt of control signals by an emulator and
   (a) the transmission of outgoing control signals to a control unit; and
   (b) the capture of incoming data from a control unit;
(2) multiple emulator synchronization which allows a connected PC (personal computer) system to communicate with all emulators at the same time to simultaneously start emulator program operation in each emulator;
(3) inter-emulator communication allowing all emulators to intercommunicate without intervention by the PC system;
(4) inter-emulator "bookmarking" for recording a plurality of data signatures, each of which is indicative of a specific inter-emulator communication;
(5) event-driven (trace) RAM memory in which is stored a history of state changes on each control line, plus the state of each data bus and a time stamp for each state change;
(6) On-the-fly comparison between data written to a control unit and the same data when it is read back from the control unit; and
(7) data pattern looping wherein each emulator simultaneously supports both repetitive (looping) and non-repetitive use of data stored in emulator memory.

BRIEF DESCRIPTION OF THE DRAWING

FIG. 4 illustrates in flow diagram form the operational steps taken by the test system to perform a multiple emulator synchronization operation;

FIG. 9 illustrates in flow diagram form the steps taken by the test system to perform an inter-emulator bookmarking operation;

DETAILED DESCRIPTION

The above described problems are solved and a technical advance achieved in the field by the simulated channel/control unit test system (hereinafter referred to as "test system") of the present invention which is programmable to exercise a control unit to which it is attached to detect timing problems or error conditions in the control unit.

Definitions

A "channel" is defined as the end of the host processor (mainframe computer) interface with which a control unit communicates. The term "channel" is generally understood to apply to the architecture of IBM System/360, System/370 and compatible systems.

A "control unit" is a device which functions to manage, in coordination with the host processor, the reading and writing of data between a host processor and a plurality of data storage (peripheral) devices.

The term "FIPS" refers to the channel/control unit interface (hereinafter referred to as the "channel interface") described in "IBM System/360 and System/370 I/O Interface Channel to Control Unit Original Equipment Manufacturers' Information," IBM Document No GA22-6974-09-. The term "FIPS" is an acronym for "Federal Information Processing System".

Simulated Channel/Control Unit Test System Architecture

Figure 1:
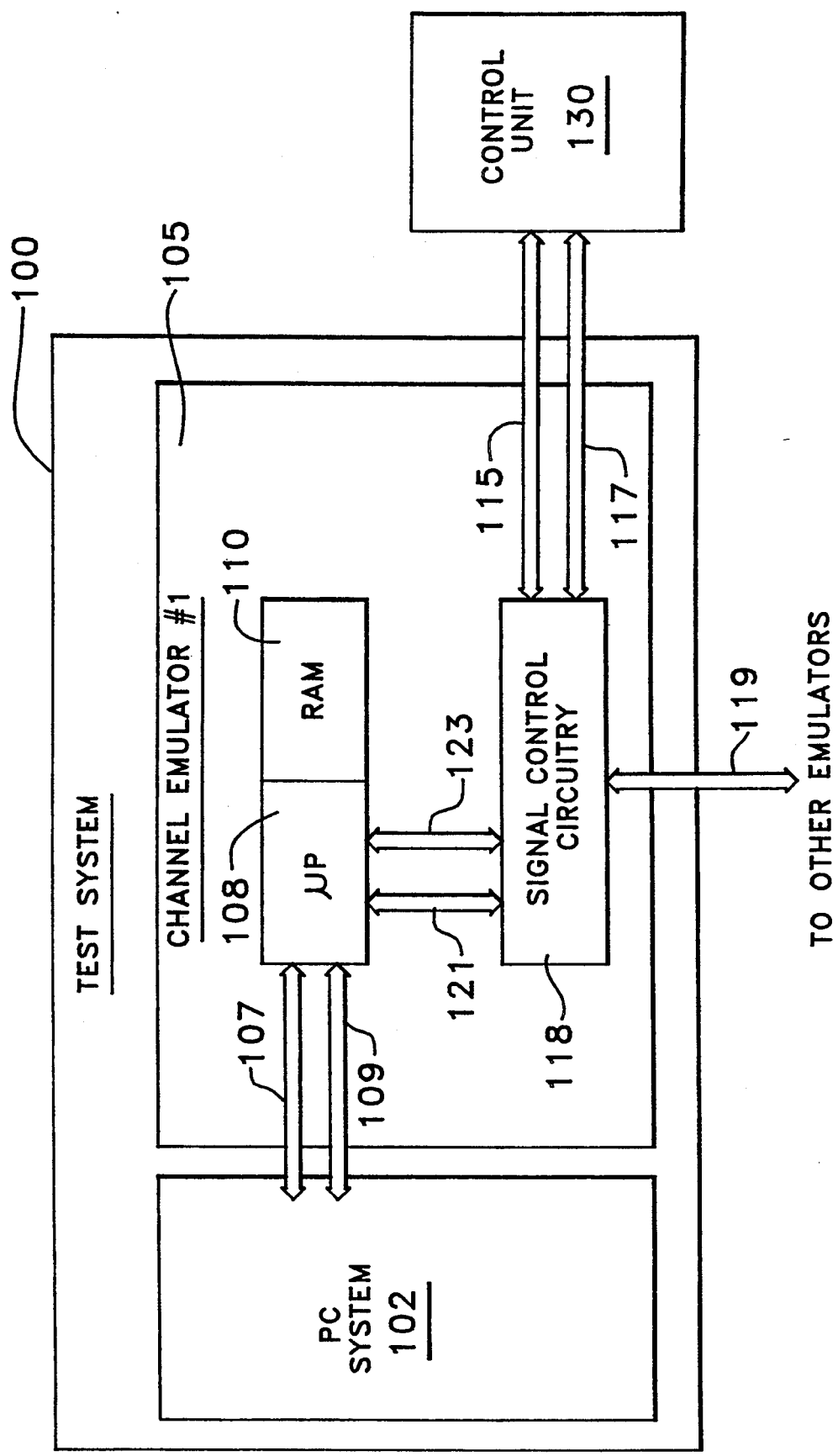
FIG. 1 illustrates the architecture of the simulated channel/control unit test system.

FIG. 1 illustrates the hardware architecture of the simulated channel/control unit test system 100. As shown in FIG. 1, test system 100 is comprised of at least one channel emulator 105 which operates under the control of a connected PC system 102 which functions to initiate certain emulator operations. Each channel emulator 105 contains a microprocessor 108 with associated RAM memory 110 and connected digital signal control circuitry 118. Channel emulator 105 generates and receives the signals typically transmitted between a host mainframe computer (not shown) and a control unit 130.

The test system 100 is pre-programmed by a PC system 102 to operate one or more channel emulators 105 so as to simulate the interaction of a corresponding number of host processor channels with a control unit 130.

In one exemplary embodiment, the control processor is a PC (personal computer) system 102 and each channel emulator 105 emulates an IBM FIPS channel. For purposes of this disclosure, PC system 102 is a typical personal computer, such as an IBM type AT or compatible PC system 102. The system of the present invention is also capable of functioning with other interfaces such as ESCON (Enterprise Systems Connection, described in IBM Document No. SA 22-7202, "ESCON I/O Interface"), IPI (Intelligent Peripheral Interface), SCSI (Small Computer System Interface), and the like.

PC system 102 communicates with each channel emulator 105 by means of the data and address buses 109, 107 that are part of a typical PC system 102. Communication between PC system 102 and a given channel emulator 105 is via well-known PC system I/O, IRQ (interrupt request) and DMA (direct memory access) techniques. Each channel emulator 105 is connected to control unit 130 by two buses—a data bus 115 and a "tag" (control signal) bus 117.

The use of a PC system 102, as compared to a far more expensive mainframe host computer, is advantageous from the standpoint of cost-effectiveness for conducting control unit 130 testing. Furthermore, the channel emulation capability and flexibility provided by an easily programmable PC system 102 configured in the environment of the present invention exceeds that of any existing mainframe computer.

The test system 100 of the present invention includes digital signal control circuitry 118 that provides programmably controlled timing between receipt of control signals from the control unit 130 and the initiation of certain responsive events. These events include the transmission of certain tag (control) signals from test system 100 to control unit 130, and the capture (storing) of data received from control unit 130. The present test system 100 can therefore regulate the timing of these tag signals and capture of these data signals in pre-programmed timed sequences to simulate various signal timing scenarios in a manner heretofore unavailable to the design and test engineer.

Channel Emulator

Figure 2:
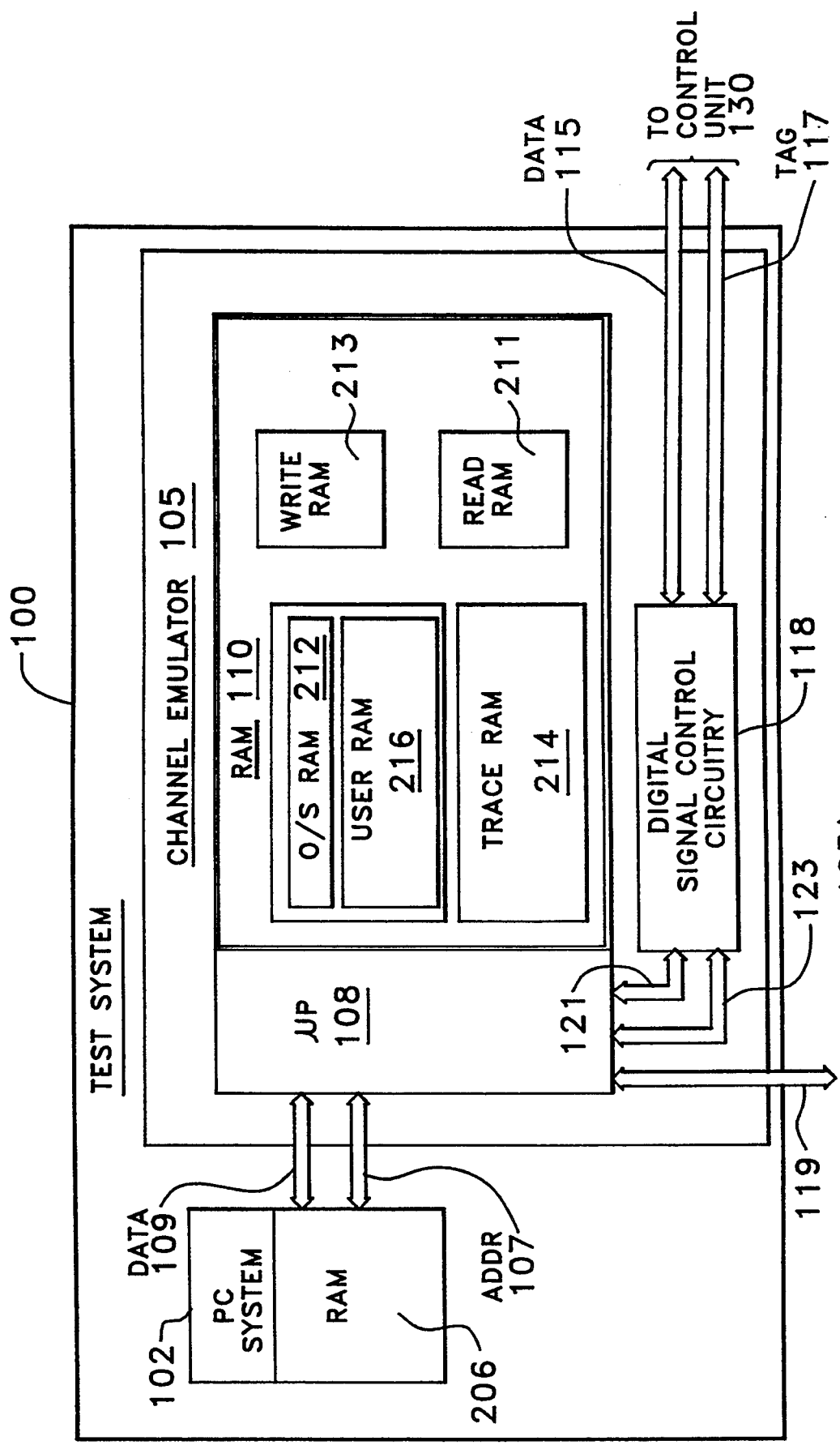
FIG. 2 illustrates the memory configuration of a channel emulator.

FIG. 2 illustrates the software/hardware architecture of a typical channel emulator 105 in test system 100 and shows the allocation of the various programs and data storage areas in channel emulator RAM 110.

Each channel emulator 105 is typically implemented on two circuit boards that are of physical dimensions appropriate for mounting within PC system 102 backplane (not shown). Channel emulator 105 includes a microprocessor 108 that regulates the operation of the digital signal control circuitry 118 used by the channel emulator 105 to provide emulator signal generation and processing. In an exemplary embodiment, microprocessor 108 is an AMD29000 RISC microprocessor. Microprocessor 108 and associated digital signal control circuitry 118 function to emulate the hardware functions of an FIPS-type channel interface between a mainframe computer and a control unit 130. Other microprocessors could be used in test system 100 to accomplish similar results within the scope of the present invention.

As shown in FIG. 2, channel emulator RAM 110 is divided into a number of areas, each of which is described below.

Operating System RAM and User RAM

Channel emulator operating system ("O/S") RAM 212 is used to store the channel emulator operating system. User RAM 216 is used for storing user-written emulator programs which are interpreted by the channel emulator operating system to control the operation of channel emulator 105.

Figure 7:
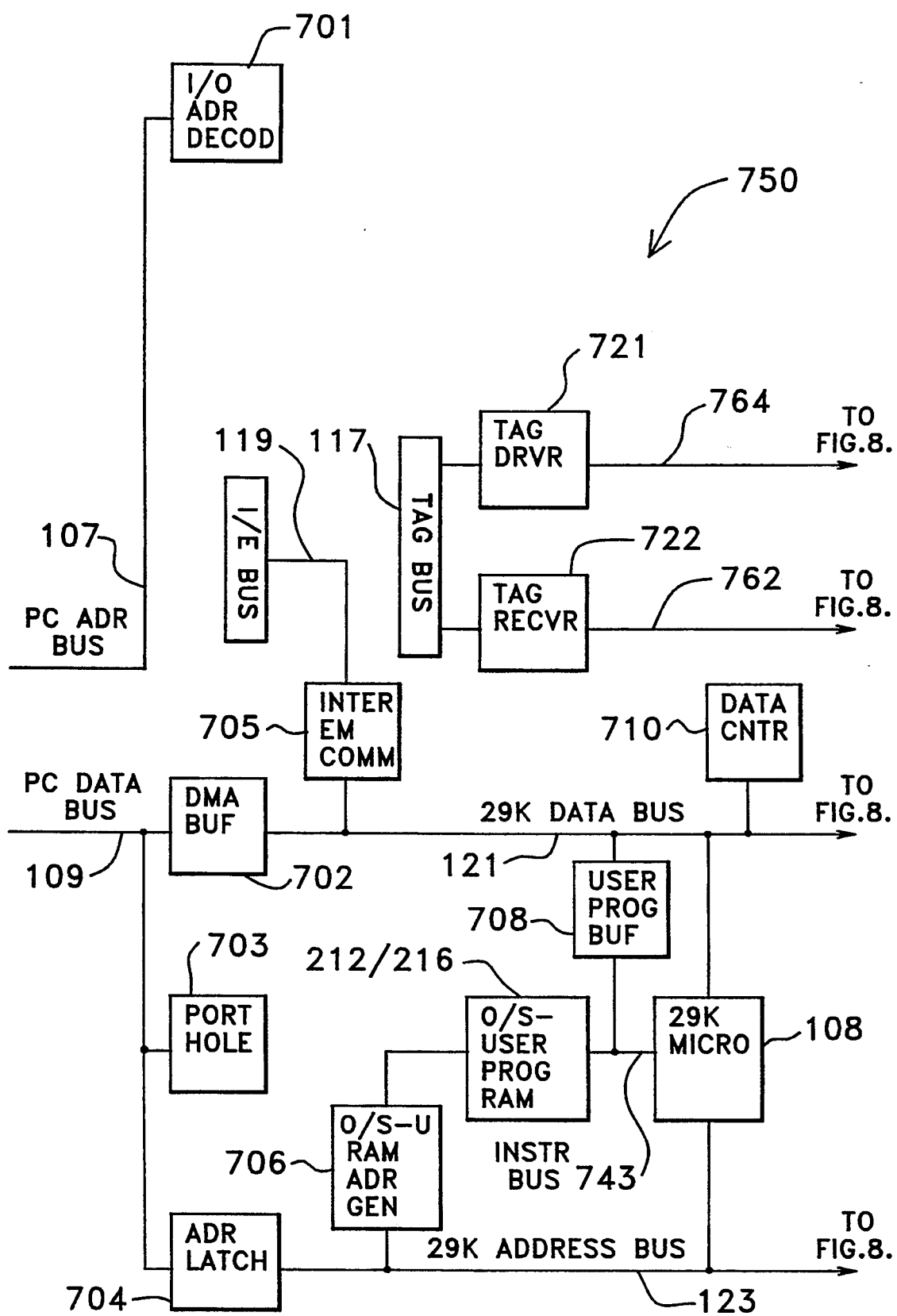
FIGS. 7 and 8 illustrate the basic hardware elements comprising a channel emulator.
Figure 8:
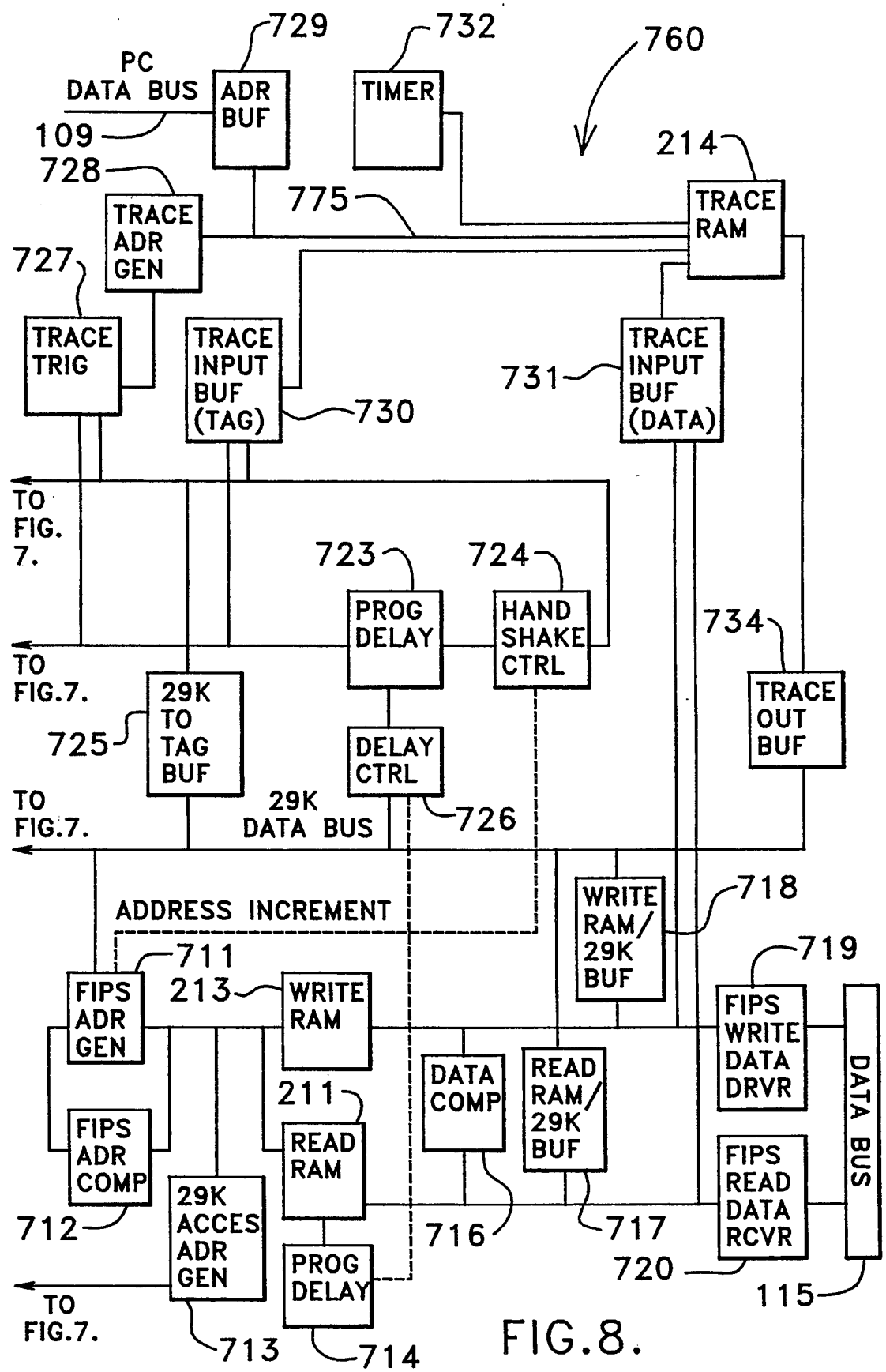

O/S RAM 212 and user RAM 216 areas are 32 bits wide and reside in the same physical RAM 110. Approximately 16K bytes of this RAM 110 are typically required for the operating system, with the remainder available for emulator programs. Channel emulator 105 functions with either a 32K×32 or 128K×32 RAM 110 chip set, depending upon the diagnostic memory requirements for a specific application. The dividing line between User RAM 216 and O/S RAM 212 is entirely arbitrary and is set by the operating system programmer. The entire RAM area 110 can be read or written as data by the emulator microprocessor 108 via data bus 121, or read as instructions via instruction bus 743. These buses are shown in FIG. 7, which is described below.

Read RAM and Write RAM

Read RAM 211 and Write RAM 213 are used to store data transmitted over the system data bus 115 between a channel emulator 105 and a control unit 130. Write RAM 213 contains data that is to be transmitted over system data bus 115 to control unit 130. Data parity can be set in Write RAM 213 by test system 100 to generate either valid or invalid parity for data transmitted to a control unit 130. Read RAM 211 contains data received over system data bus 115 from control unit 130. Data stored in Read RAM 211 is compared with data contained in write RAM 213, which typically contains the data originally written to control unit 130. Read RAM 211 and Write RAM 213 are functionally independent, but share the same address generator 711 (shown in FIG. 7). The channel emulator 105 typically functions with either 32K×8 or 128K×8 Read and WriteRAMs 211/213. The choice of Read/Write RAM size is dictated by the maximum data pattern size (described below) required for a given application.

Trace RAM 214

This area of memory contains a history of the data bus 115 and tag 117 lines plus a time stamp for each state change on the tag lines 117. It is actually two areas of memory combined into one. One area contains tag line and time stamp data and the other area contains data bus and parity data.

Test System Environment

Figure 3:
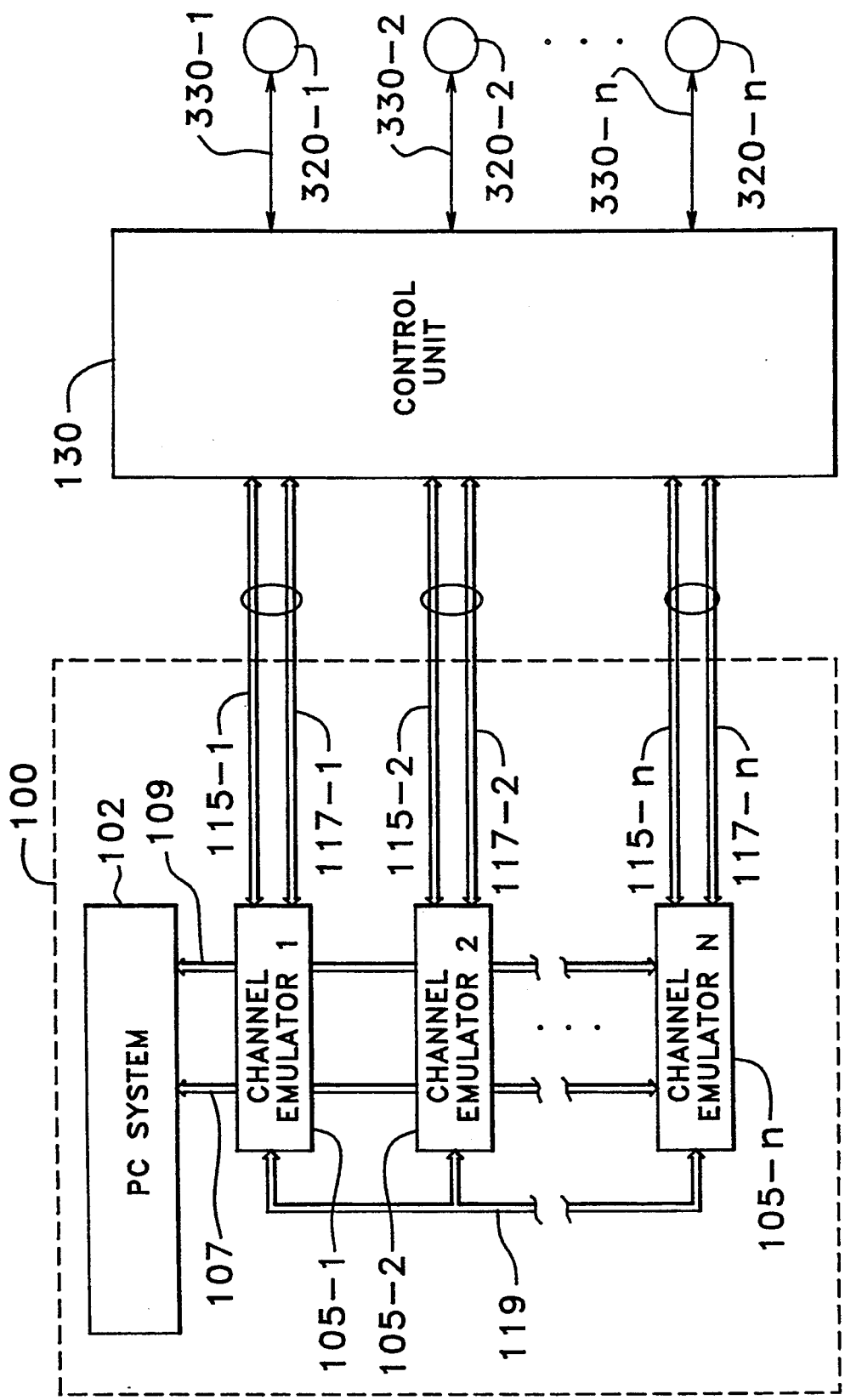
FIG. 3 illustrates the overall environment of a test system that includes the simulated host computer/channel interface of the present invention.

FIG. 3 illustrates the overall environment of a typical test system 100 that is used to emulate the interconnection of a host processor, by one or more channels, to a control unit 130 that operates to control a plurality of data storage devices 320. In a typical application, the data storage devices 320 comprise DASD (direct access storage) devices, which are typically disk drives, or serial devices, such as tape drives. Each of these data storage devices 320 is connected by a bus 330 to control unit 130 for exchanging data and control signals therebetween.

In a typical, non-simulated environment, control unit 130 interfaces these data storage devices 320 with one or more host processors not shown) by a plurality of channels. Control unit 130 functions to manage the storage and retrieval of data stored on the individual storage device units 320 and responds to control signals received from a host processor. The data received from the host processor over a given channel is buffered by control unit 130 and stored on a selected storage device 320 independent of host processor control in order to free up the host processor to perform other processing tasks.

In performing a data read operation, for example, the host processor transmits control commands to control unit 130 which identify a data record to be read from a storage device 320. Control unit 130 retrieves the identified data record from the storage device 320 and stores the retrieved data record in the control unit buffer memory (not shown). Once the data record has been retrieved, control unit 130 transmits the retrieved data record to the host processor over a selected channel. An analogous situation occurs with respect to a data write operation.

A difficulty with this typical environment is that the host processor and control unit 130 operate concurrently so that data is being transmitted asynchronously over different channels between the host processor and control unit 130. A further complicating factor is that a plurality of host processor channels can be connected to a single control unit 130. The possibility exists that two or more channels will simultaneously transmit a request to control unit 130. It is obvious that the management of these multiple concurrent and sometimes simultaneous signal transmissions can result in signal race or deadlock conditions. The control unit 130 must be capable of handling all possible signal combinations and signal timing conditions in order to operate properly with the storage devices 320 and interconnected host processor channels. Therefore, it is critical that a design or test engineer be able to exercise a control unit 130 under any arbitrary set of signal and timing conditions. Similarly, a test engineer must be able to emulate the simultaneous operation of multiple channels to determine whether a failure has occurred in a control unit 130 and to replicate the failure in order to diagnose and repair the problem that caused the failure. Existing test equipment is unable to adequately exercise control unit 130 to the degree necessary to identify a full range of potential problems. Furthermore, it is not feasible to synchronize a plurality of actual host processor channels to simulate certain timing conditions such as signal race conditions.

Test System High-Level Operation

The test system 100 of the present invention is interconnected with control unit 130 in lieu of a plurality of host processors and channels in order to test a control unit 130. In an exemplary embodiment, test system 100 may contain up to 16 channel emulators 105, each of which is interconnected to PC system 102 in order to emulate a corresponding plurality of channels interconnected between a host processor and a control unit 130. A plurality of channel emulators 105 can be concurrently operated in order to exercise the connected control unit 130 in a multiple channel environment. The operation of the plurality of channel emulators 105 is synchronized and controlled by PC system 102 in order to emulate possible multiple channel situations, such as signal race conditions, that the channel control unit 130 might encounter. Each of these channel emulators 105 also includes digital signal control circuitry 118 and memory 211, 214 to receive and store the response signals transmitted by control unit 130 to the test system 100. Tag (control) line monitor circuitry in block 118 as well as trace RAM 214 is included in each of the channel emulators 105 to monitor and store the received tag signals in order to identify the presence of specific signals sent on the tag lines by control unit 130 to test system 100.

Prior to an emulation operation, PC system 102 first transfers the operating system to each channel emulator 105. Additionally, PC system 102 may transfer one or more emulator programs to the channel emulators 105. These emulator programs, when interpreted by the emulator operating system, cause the channel emulator 105 to accomplish the desired tag bus control sequences and/or data transfers. When PC system 102 signals a selected channel emulator 105, the operating system in the selected emulator 105 begins execution of the emulator program. Once the emulator program is started, it runs independent of any further PC system 102 intervention. At the completion of the emulator program, the channel emulator 105 signals the PC system 102 and passes back the status of the executed emulator program to the PC system 102.

Data transfers between a channel emulator 105 and control unit 130 are made to and from the emulator's Read/Write RAM area 211/213 by channel operation per well-known FIPS protocol. PC system 102 has DMA read access to both the Read RAM 211 and Write RAM 213. Prior to performing a write operation to the emulated channel, PC system 102 loads the data to be written into the channel emulator's Write RAM 213 via a DMA operation. Similarly, at the end of a read operation on the channel, PC system 102 can access via DMA the read data from emulator Read RAM 211.

Test System Features

Using digital signal control circuitry 118 in conjunction with the emulator O/S and emulator software, channel emulator 105 can perform sequences of tag (control) signal outputs from an emulator 105 wherein the application of these tag signals to a control unit 130 occurs at predetermined time intervals relative to tag signal inputs from control unit 130. The sequence of tag signal outputs can be recorded in channel emulator Trace RAM 214. Data signals from the control unit can also be recorded in channel emulator Trace RAM 214.

In this manner, emulator program control can be used to exercise a control unit 130 to the fullest extent possible, including emulating multiple simultaneous requests to control unit 130 by using multiple emulators 105. Channel emulator Trace RAM also provides a record of the data and control signals exchanged between a given channel emulator 105 and the associated control unit 130.

User Programming

All of the test system 100 features (described in detail below) are programmable by a test system user. In order to program a given feature, a channel emulator source code user program is first assembled into object code. This object code is then loaded into channel emulator user RAM 216. The object code in user RAM is subsequently executed by the microprocessor 108 according to the operating system code stored in O/S RAM 212 in channel emulator 105 in response to the interpretation of a command from PC system 102 in order to effect the desired signal transmission/capture sequences between channel emulator 105 and control unit 130.

The following describes in greater detail the novel features of the test system 100:

Multiple Emulator Synchronization

FIG. 4 illustrates the operational steps taken by test system 100 to perform a multiple emulator synchronization operation. The method of the present invention allows PC system 102 to optionally communicate with all emulators 105 at the same time to provide a simultaneous start of program operation for all emulators 105. This allows controlled testing of race/collision scenarios not possible or very difficult to obtain with other emulators or computer configurations.

At step 410, PC system 102 loads each emulator 105 with the emulator program to be executed. Each emulator 105 is then set to a ready-to-run state at step 420. At step 430, all emulators 105 enter a loop to wait for a common start signal from the PC system 102. When PC system 102 sends this common start signal, at step 435, it is simultaneously received by all emulators 105. Each emulator 105 then begins executing the emulator program at step 440. Because all emulators 105 receive the common start signal at the same time and because all emulators 105 are running the same program code with essentially the same clock frequency, they are synchronized.

Data Pattern Looping

Figure 5:
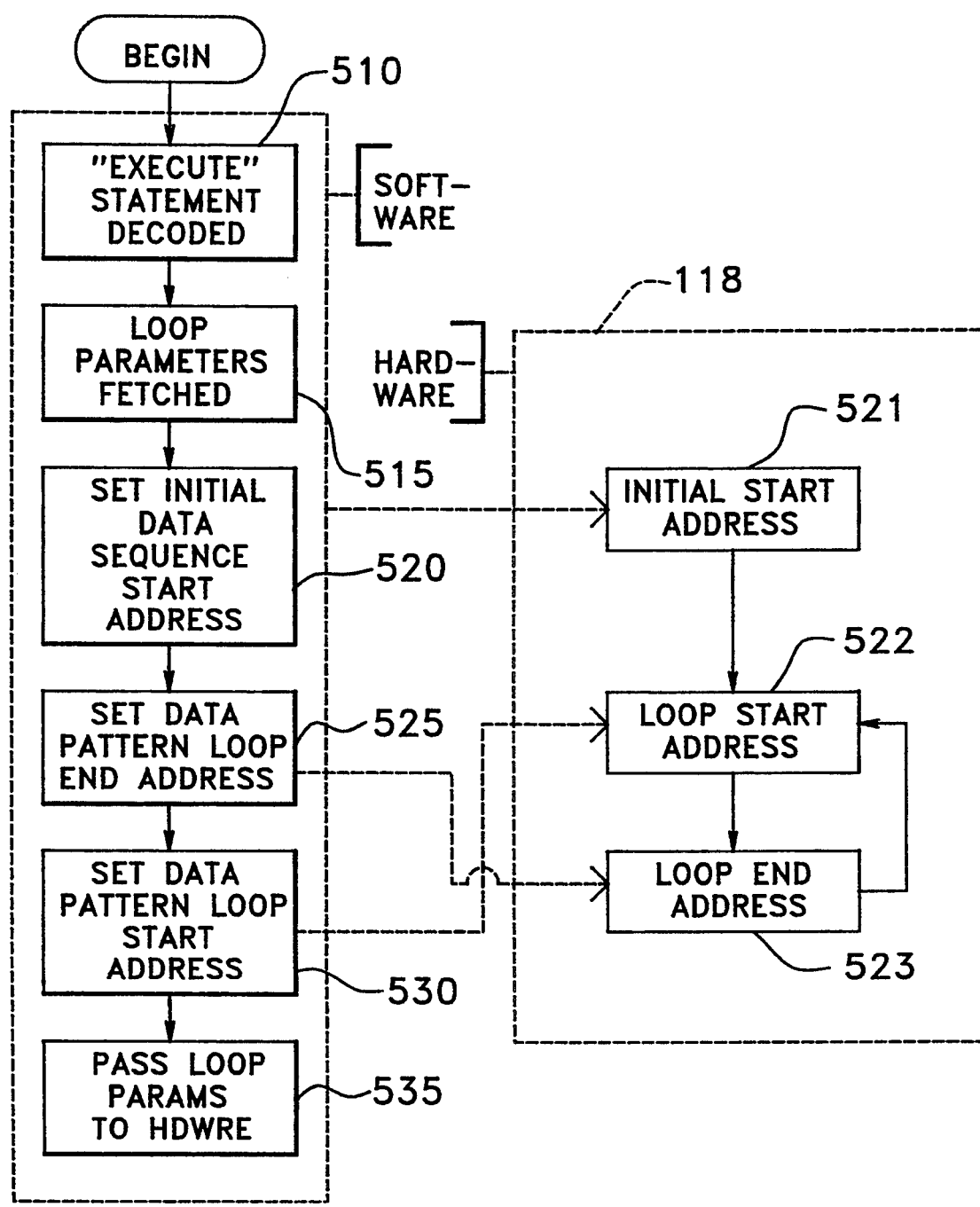
FIG. 5 illustrates in flow diagram form the operational steps taken by the test system to perform a data pattern looping operation.
Figure 12:
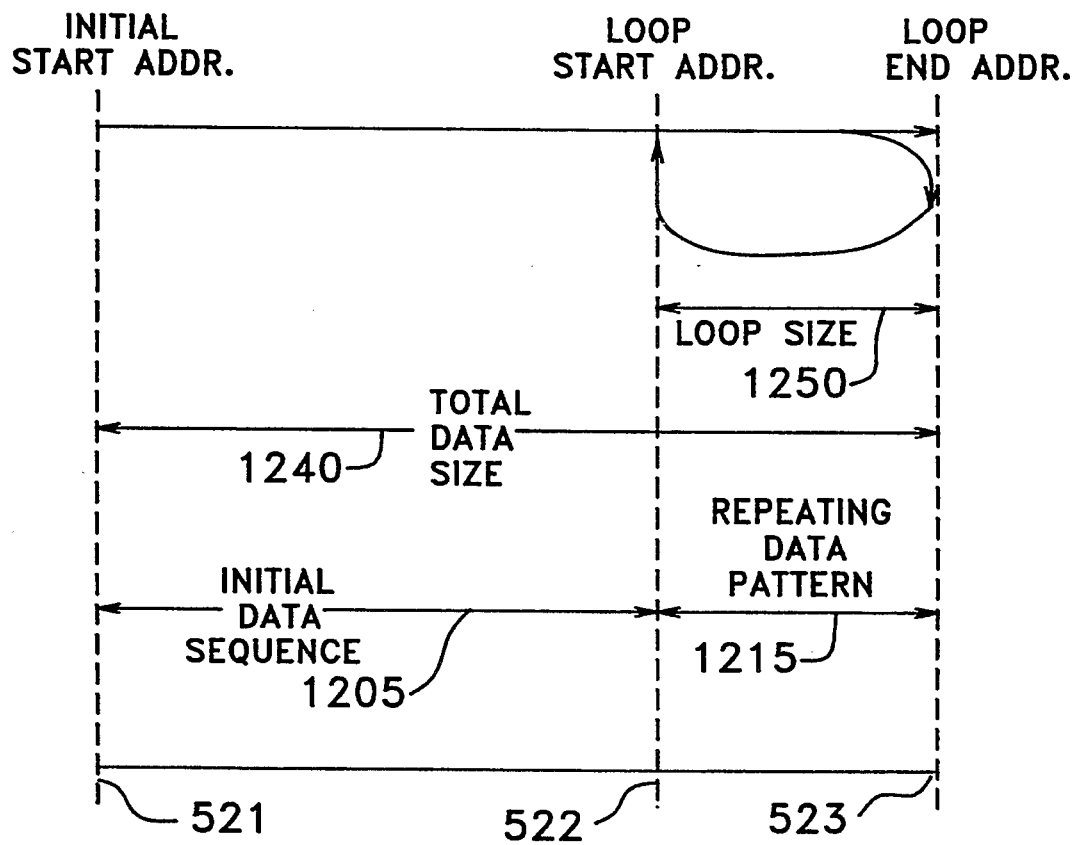
FIG. 12 illustrates in flow diagram form the steps taken by the test system to perform data pattern looping.

FIG. 5 illustrates in flow diagram form the operational steps taken by test system 100 to perform a data pattern looping operation. FIG. 12 illustrates in flow diagram form the steps taken by the test system 100 to perform data pattern looping. Each channel emulator 105 supports both repetitive (looping) and non-repetitive use of the data in Read/Write RAM 211/213. This feature allows a unique initial data sequence to be output, followed by a repeating data pattern as shown in FIG. 12. In performing a data pattern looping operation, emulator 105 first outputs (to control unit 130) an initial data sequence 1205 which has a start address at 521. Data stored between addresses 521 and 522 is output only once. Emulator 105 then outputs a repeating data pattern 1215 stored between addresses 522 and 523.

The data pattern looping operation is described in more detail in FIG. 5. At step 510, the emulator operating system decodes an "Execute"-type statement from PC system 102. At step 515, parameters for Read/Write RAM "initial data sequence start address" 521, byte count, total data size 1240, and data pattern loop size 1250 are fetched from User RAM 216 in a parameter list associated with the Execute statement. At step 520, the Read/WriteRAM start address is set to the "initial data sequence start address" 521 as specified in the Execute statement. The address generator for read RAM 211 and Write RAM 213 is common to both, so the start address 521 applies to both RAM areas. At step 525, the data pattern "loop end address" 523 is set to the address resulting from adding the "total data size" 1240 to the "initial data sequence start address" 521. At step 530, the data pattern "loop start address" 522 is set to the address resulting from subtracting the data pattern loop size 1250 from the data pattern "loop end address" 523.

The addresses between the data pattern "loop start address" 522 and the data pattern "loop end address" 1230 contain a data pattern 1215 that will be repetitively transferred between an emulator 105 and control unit 130. The byte count determines how many data bytes will be output, and therefore how many times the data pattern 1215 will be repeated (after allowing for the number of bytes in the initial data sequence 1205). At step 535, the byte count, "initial data sequence start address" 521, data pattern "loop start address" 522, and data pattern "loop end address" 523 are passed to the emulator digital signal control circuitry 118 which then performs the requested data transfer.

On-the-Fly Data Comparison

Figure 6:
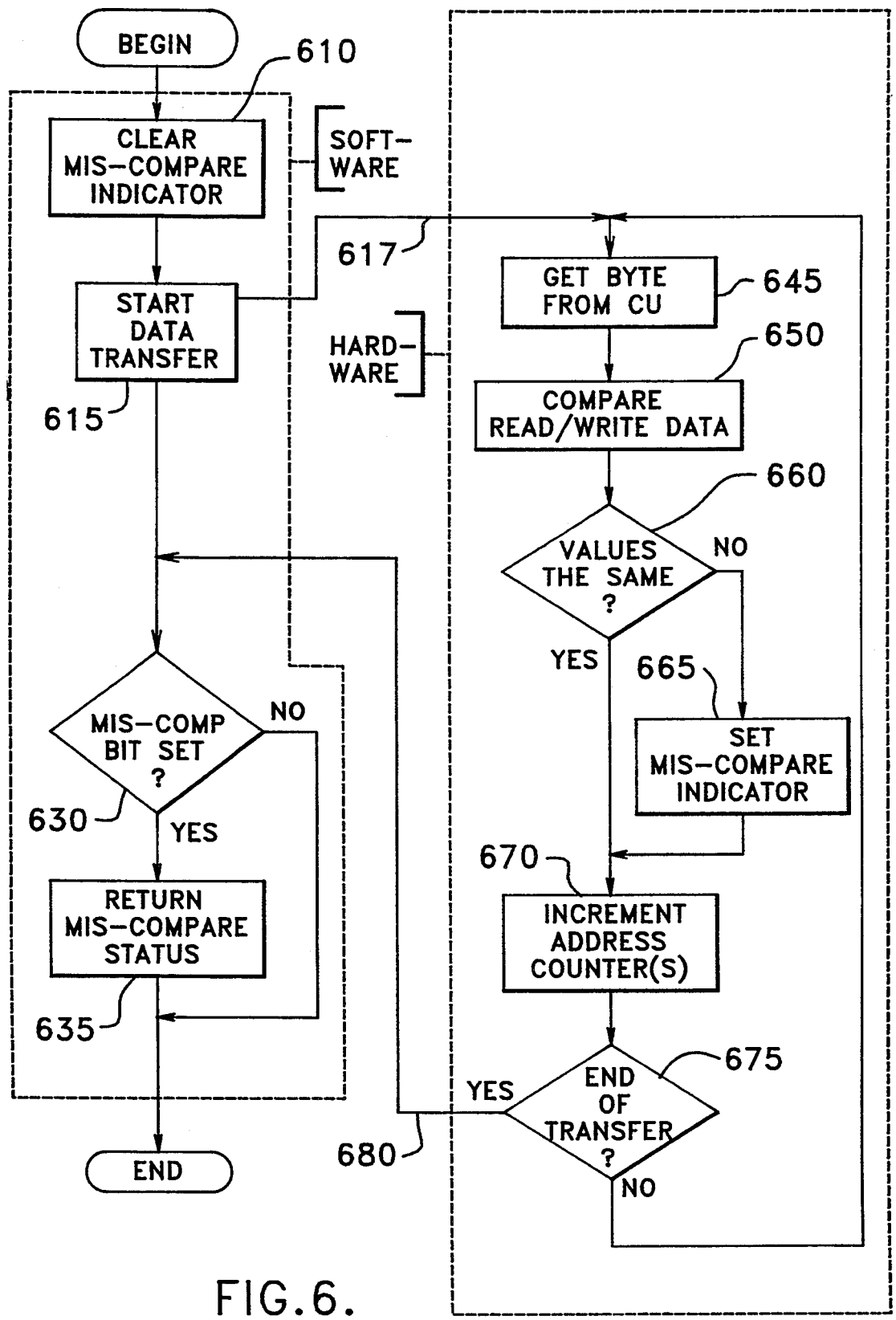
FIG. 6 illustrates in flow diagram form the operational steps taken by the test system to perform an on-the-fly data comparison operation.

FIG. 6 illustrates in flow diagram form the operational steps taken by test system 100 to perform an "on-the-fly" (real-time) data comparison during a read operation. Test system 100 provides for "on-the-fly (real-time) data comparison of previously written data with data being read, with the ability to either stop or continue on error. If a test system user chooses to have emulator 105 stop on a compare error, emulator 105 will, upon determining a data compare error, send the proper tag line sequence to halt data transfer between emulator 105 and the connected control unit 130.

At step 610, emulator software clears a miscompare indicator. At step 615, the emulator operating system enables digital signal control circuitry 118 to initiate a data transfer operation. Control is then passed from emulator software to digital signal control circuitry 118 via line 617.

At step 645, emulator 105 receives a data byte from control unit bus 115 and stores it in Read RAM 211. At step 650, the byte read from control unit 130 is compared to the byte stored in WriteRAM 213 at the same address. At step 660, if the byte values are not the same, then at step 665, the miscompare indicator is set and latched. At step 670, the address counter is incremented. At step 675 a test is made to determine whether the end of the data transfer has been reached. If not, control is then passed back to step 645. If the end of the data transfer has been reached, then control is passed back to emulator software via line 680. At step 630, a check is made to see whether the miscompare indicator has been set. If so, at step 635, a mis-compare status is returned to the calling program. If the mis-compare indicator has not been set, then the routine is exited with a normal completion status indication.

Inter-Emulator Communication and Bookmarking

FIG. 9 illustrates in flow diagram form the steps taken by the test system to perform an inter-emulator communication and bookmarking operation. The test system 100 provides for direct inter-emulator communication allowing emulators 105 to pass messages without going through the PC system 102. This allows each of the emulators 105 to coordinate their programs in multi-emulator testing scenarios. An important aspect of this inter-emulator communication is that each inter-emulator data transfer is simultaneously broadcast to all emulators 105 via inter-emulator bus 119.

At step 910, the operating system in a transmitting emulator 105 decodes a "Send parameter to inter-emulator bus"-type statement from user RAM 216. The parameter value to be sent is then fetched from user RAM 216, at step 920. At step 930, the parameter value is placed on inter-emulator bus 119 by the transmitting emulator 105. The parameter value to be transmitted is thus "broadcast" to all other emulators 105*. The inter-emulator bus 119 is thus used as a means for allowing any given emulator 105 to write to all other emulators 105* to accomplish a user-defined task.

The test system 100 employs the inter-emulator communication feature to provide "inter-emulator bookmarking" for recording a plurality of data signatures in each emulator's RAM memory 110, wherein each of the data signatures is indicative of an inter-emulator communication (read/write) operation. This bookmarking feature provides the ability to timewise correlate the data stored among each of the emulators 105 in a multi-emulator system for purposes of post-run analysis of signal timing conditions.

To perform an inter-emulator bookmarking operation, the value present on inter-emulator bus 119 is stored by receiving emulators 105* at step 940. When an inter emulator write is detected by control circuitry 118, then a "bookmark" indicator and a time stamp value are stored in trace RAM 214 indicating that a "bookmark" has been received by each emulator 105,. At step 950, the time stamp value is stored in each of the emulators' 105* trace RAM 214.

In-Tag/Out-Tag Timing and Data Capture Control

Timing between in-tags (Service In, Data In) and out tags (Service Out, Data Out, Command Out) used during high speed data transfer is under program control. This allows testing of handshake timing margins during data transfer between the channel emulator 105 and control unit 130.

Figure 10:
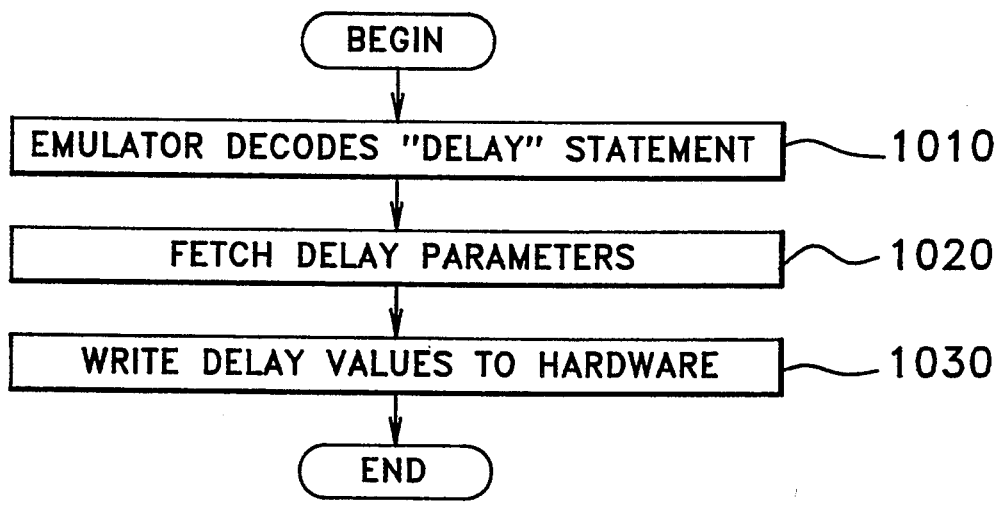
FIG. 10 illustrates in flow diagram form the steps taken by the test system to perform In-Tag/Out-Tag timing control.

FIG. 10 illustrates in flow diagram form the steps taken by the test system to perform In-Tag/Out-Tag timing and data capture control. Timing between in-tags (Service In, Data In) and capture of incoming data during high speed data transfer are under program control. A list of typical signals which can be delayed by the present system are listed in TABLE I below.

At step 1010, the operating system in emulator 105 decodes a "Delay" statement from user RAM 216 and determines which signal delay is to be modified. At step 1020, delay parameters are fetched from user RAM 216. The value of the parameter is written to the appropriate programmable delay circuit 714 or 723, at step 1030, to change the delay periods used by the emulator signal control circuitry 118.

Event-Driven Trace RAM

Figure 11:
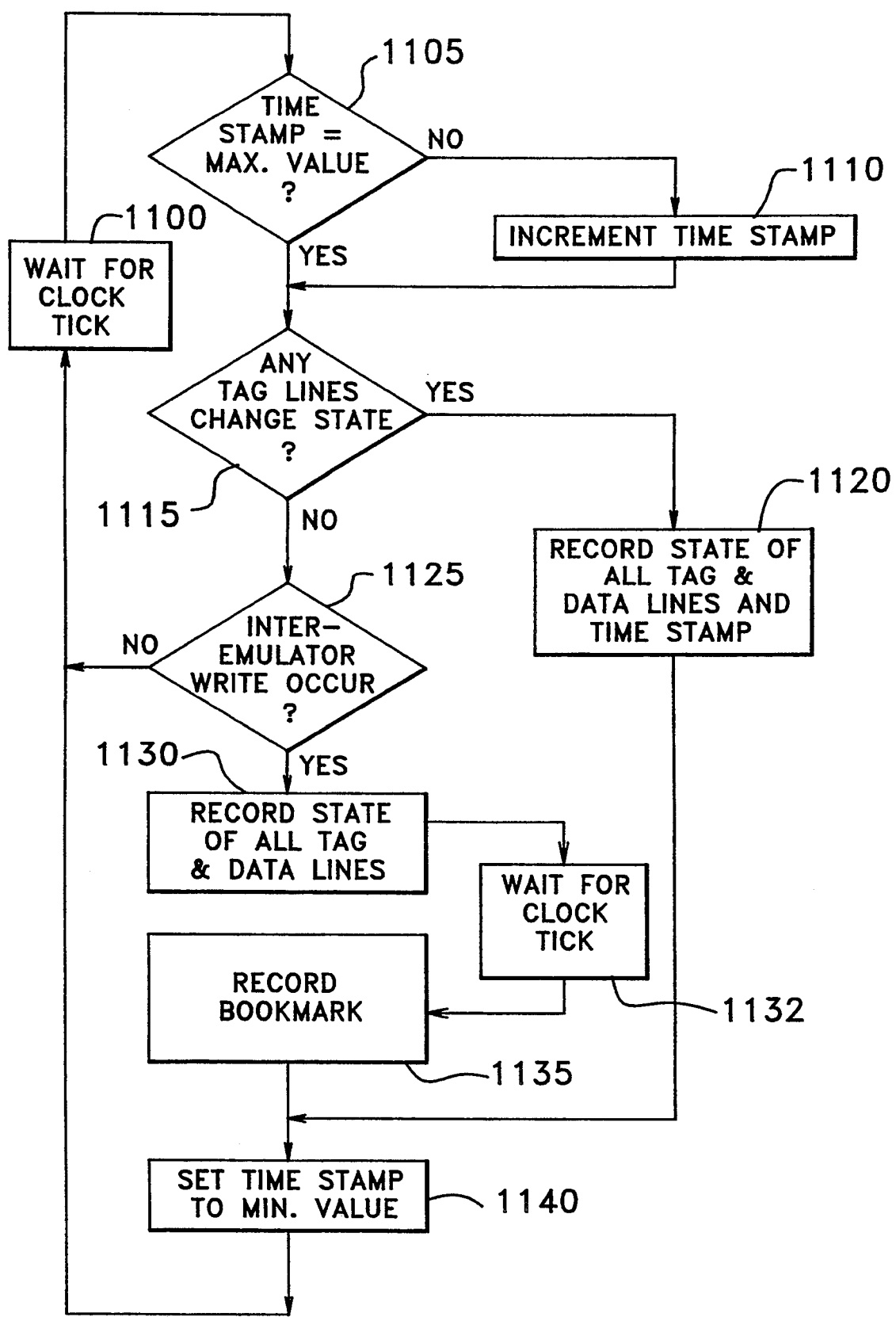
FIG. 11 illustrates in flow diagram form the steps taken by the test system to perform In-Tag/data capture control.

FIG. 11 illustrates in flow diagram form the steps taken by an emulator 105 to perform tag/data capture control. Trace RAM is event driven, and includes a time stamp which indicates the time since the last captured I/O event. This time stamp does not roll over when the maximum time is reached, i.e., the time stamp "sticks" at a predetermined maximum value, indicating that at least that amount of time has elapsed. This prevents aliasing of time stamp information. Another predetermined value of the time stamp (e.g., the maximum time stamp value plus 1) is reserved as a special value to indicate that an inter-emulator write has occurred.

At step 1100, emulator 105 waits for a clock tick from a clock (not shown). At step 1105, the time stamp in the emulator's trace RAM 214 is checked to determine whether the time stamp has reached its maximum value. If not, then the time stamp is incremented at step 1110. If the time stamp has reached the maximum value, it is not incremented. At step 1115, a test is performed to determine whether the state of any tag lines 117 (connected to this specific emulator) have changed.

If so, then at step 1120, then the state of all tag and data lines 117, 115, as well as the time stamp value is recorded in trace RAM 214. Control then passes to step 1140. If, however, at step 1115 no tag line state change was observed, then step 1125 is executed. At step 1125, a test is made to determine whether an inter-emulator write has occurred since the last pass through this routine. If not, then control passes back to step 1105. If an inter-emulator write has occurred, then at step 1130, the state of all tag and data lines 117, 115, as well as the time stamp value is recorded in trace RAM 214. At step 1132, emulator 105 waits for a clock tick. When a clock tick has been detected, then at step 1135, a "bookmark" is recorded in trace RAM 214. Finally, at step 1140, the time stamp is set to a minimum value and control returns to step 1105.

Channel Emulator Hardware

FIG. 7 illustrates the basic hardware elements comprising a typical channel emulator 105. This diagram is a simplified version of the actual emulator circuitry, and shows only the components which effect the major functions of test system 100.

PC/Emulator Circuitry

I/O Address Decoder 701 decodes the I/O address presented by the PC system 102 on the PC address bus 107. I/O address decoder 701 is used in communication between PC system 102 and emulator 105.

DMA Buffer 702 is a buffer which provides isolation of PC system 102 data from the emulator data bus 121 and which allows direct memory access (DMA) transfer of data to take place between PC system 102 and emulator 105.

Port Hole Buffer 703 is a 16 bit buffer which acts as a "mail box" between PC system 102 and emulator 105. PC system 102 may place a message in the mail box without waiting for emulator 105 to retrieve the message, and vice versa. This is typically used to pass operational status between PC system 102 and emulator 105.

Address Latch 704 builds a 24 bit address from three 8-bit address bytes presented sequentially by PC system 102 to emulator 105. The 24 bit address is necessary for accessing RAM memory 110 in microprocessor 108 address space. Other embodiments could of course employ different numbers of bits to form the address.

Inter-Emulator Communication Latch 705 is a data latch which is tied to the Inter-Emulator Bus 119 which is parallel connected across all emulators 105 residing in a single PC system 102. This latch 705 allows several emulators 105 to communicate with each other without going through the PC system 102. This latch typically is used to pass status between emulators 105 and to allow for orchestration of multi-emulator operation.

O/S-User RAM Address Generator 706 generates addresses for the operation of the emulator Operating System/User RAM 110. This RAM is used to store both microprocessor 108 operating system code, and to store the user supplied programs which determine what tasks will be performed by emulator 105. In general, the operating system interprets user code and handles communication with PC system 102 via port hole buffer 703.

OS/User Program RAM 212/216 is the RAM in which the Operating System and the user supplied code reside. The operating system and user code are respectively analogous to DOS and a user-BASIC program, for example.

User Program Buffer 708 is a buffer used to connect a user program (contained in the O/S-User program RAM) to microprocessor data bus 121 so that microprocessor 108 can gain access to the user program.

Emulator Microprocessor 108 is, in an exemplary embodiment, an AMD 29000 microprocessor, which gets instructions from O/S-User RAM 212, 216 via Instruction Bus 743.

FIPS Data Bus Circuitry

Data Counter 710 is circuitry which keeps track of the number of bytes transmitted or received over channel interface between emulator 105 and control unit 130. The user can set this counter 710 to a specific number to cause an executing emulator program to halt transmission when that number of bytes has been sent/received. Data counter 710 is also used in determining the residual byte count, i.e., the difference between the actual and anticipated number of bytes transferred over the emulated channel.

FIPS Address Generator 711 generates the address for the Write and Read RAMs 213/211 during times of data transfer across the emulated channel.

FIPS Address Comparator 712 compares the present address on the Write and Read RAM address bus 123 with a preset high address limit. When this limit address is reached, address generator 711 is reloaded with a preset low limit address. This allows looping through a predetermined area of RAM 211, 213 for purposes of sending repeating data patterns across the emulated channel.

Microprocessor Access Address Generator 713 generates the address for the FIPS Write RAM 213 and FIPS Read RAM 211 during times of microprocessor 108 access and DMA access to these RAMs.

Write RAM 213 is the RAM which contains data transferred from emulator 105 to channel bus 115.

Read RAM 211 is the RAM which contains data transferred from channel bus 115 to emulator 105.

Data Comparison Circuit 716 compares data in write RAM 213 with data received by read RAM 211. This comparison is done at full speed, so expected data patterns can be verified in real time.

Read RAM/Microprocessor Buffer 717 is used to buffer data to microprocessor data bus 121 from read RAM 211 during microprocessor 108 and DMA access to that RAM 211.

Write Ram/Microprocessor Buffer 718 is used to buffer data between microprocessor data bus 115 and the write RAM 213 during microprocessor 108 and DMA access to that RAM 213.

FIPS Write Data Driver 719 buffers data written from emulator 105 to channel interface 115. This driver 719 converts the TTL level signals in emulator 105 to the signal levels required by the channel interface.

FIPS Read Data Receiver 720 buffers data read from channel interface 115 by emulator 105. This receiver 720 converts the channel interface level signals to TTL levels required by emulator 105.

FIPS Tag (Control) Circuitry

Tag Driver 721 buffers tag signals from emulator 105 to the channel interface 117. This driver 721 converts the TTL level signals in emulator 105 to the signal levels required by the channel interface.

Tag Receiver 722 buffers tag signals sent from the channel interface 117 to emulator 105. This receiver 722 converts the channel interface level signals to TTL levels required by emulator 105.

Programmable Delay 723 is a programmable delay circuit which controls the delay time between in tags and out tags used in data transfer. Controlling the delay allows for margin testing of devices attached to the channel.

Programmable Delay 714 is a programmable delay circuit which controls the time between a data transfer in-tag and the storing of the associated data.

Delay Controller 726 buffers microprocessor data writes to the programmable delays for controlling in-tag/out-tag and data receive timing.

Handshake Controller 724 controls which tag lines 117 are involved in data transfer and end of data transfer sequences. It is also responsible for incrementing the FIPS address generator 711 after each byte is transferred.

Microprocessor to Tag Buffer Circuit 725 buffers microprocessor 108 data bus to the tag driver 721 when microprocessor 108 is used to directly access the tag lines 117.

Trace Circuitry

Trace Trigger 727 monitors in tag and out tag lines 117 and triggers a trace function to take a snapshot when either a rise or a fall is detected on any of the tag lines.

Trace Address Generator 728 generates addresses used by trace RAM 214. The trace address is incremented by a trigger signal from trace trigger block 727.

Address Buffer 729 between trace address bus 775 and the PC data bus 109 allows PC system 102 to query the trace circuitry to determine the present trace buffer address. Since trace RAM operates as a circular buffer (i.e., the addresses wrap from high value to 0000), then allowing PC system 102 access to the present trace RAM address is necessary to properly present the trace data in a meaningful format.

Trace Input Buffer (Tag) 730 buffers the in tag and out tag data to trace RAM 214.

Trace Input Buffer (Data) 731 buffers the in and out bus data to trace RAM 214.

Timer 732 provides 12 bit time-since-the-last-snapshot information to trace RAM 214. This timer information is recorded with each snapshot. This timer 732 does not roll over upon reaching maximum count, but rather "sticks" at 0xFFE. Note that the time 0XFFF is reserved as a special flag indicating that an inter-emulator communication has taken place. This allows all trace RAMs 214 in a multi-emulator configuration to be synchronized for a better understanding of trace data taken during multiple emulator scenarios. The value 0xFFE is arbitrary and could be any value desired in a given implementation.

Trace RAM 214 is a 48 bit wide RAM which records snapshots of interface 115, 117 activity (see also trace trigger block 727).

Trace Out Buffer 734 buffer allows DMA access to trace RAM data.

I/O Address Space Usage

PC system 102 communicates with each emulator 105 by both writing and reading to/from PC system I/O addresses and via the DMA channel. In one exemplary embodiment, each emulator comprises a two-circuit board set 750,760. Each emulator board set 750, 760 contains a switch bank and a jumper block (not shown) to set the I/O address group of that particular board set 750, 760. The jumper block is used to decode PC address bits 3 through 9, while a dip switch (not shown) is used to decode PC address bits 10 through 13. Normally, PC I/O address space ranges from 000 to 3FF (PC address bits 0 through 9 are decoded). In order to accommodate up to 16 emulators 105 in the PC address space, each emulator 105 also decodes the next 4 bits (bits 10 through 13) and additionally senses bit 14. Each emulator 105 is set with the same base address (typically 300h) and a unique dip switch address. Using this technique, a group of emulators 105 take only eight addresses from the standard PC I/O space while actually providing 128 distinct I/O addresses for all emulators 105. Finally, the circuitry senses bit 14 to allow the PC to communicate to all emulators 105 at the same time using common I/O addresses.

Am29000 and Operating System/User RAM

The AMD publication "Am29000 Memory Design" (AMD Pub. No. 106238) section on high speed static RAM memory design functions as an important reference in the design of the O/S-User RAM to microprocessor interface [Advanced Micro Devices. Inc., 901 Thompson Place, P.O. Box 3453, Sunnyvale, Calif. 94088]. The Am29000 microprocessor 108 has independent 32 bit wide address, instruction and data buses. This design supports burst memory accesses, i.e. emulator 105 contains an address generator for each major section of RAM 110. In burst mode, microprocessor 108 loads a starting RAM address into the appropriate address generator and reads or writes a word of data. Thereafter, as long as microprocessor 108 requests burst mode, the address generator will increment on each clock allowing the next word of data to be read or written.

The operating system space 212 (which contains Am29000 machine instructions and forms the operating system of each emulator 105), and the user data space 216 (which contains user commands to be interpreted by the operating system), share the same physical 32 bit RAM. The dividing line between the two is entirely arbitrary and is set by the operating system programmer. The entire RAM area 212/216 can be read or written as data by microprocessor 108 via microprocessor data bus 121, or read as instructions via microprocessor instruction bus 743.

On power up, the reset line to microprocessor 108 is held in a reset mode until released by an I/O write from PC system 102. In operation, PC system 102 loads the emulator O/S-User RAM 212/216 with the operating system prior to release of the reset mode. When the reset is released, microprocessor 108 begins accessing and executing instructions at address 000000 of O/S-User RAM 212/216.

In addition to reading from and writing to RAM 110, microprocessor 108 controls operation of emulator 105 by writing to I/O addresses in emulator I/O space to control such functions as mode of operation, and reading/writing tag lines 117 and data bus 115 directly. These I/O operations are entirely separate from the PC I/O operations described above.

Data RAM and FIPS Drivers

In one exemplary embodiment, Data RAM 211, 213 consists of two 128K×8 (optionally two 32K×8) bit chips and two 256K×1 bit chips. One 8-bit chip and one 1-bit chip form read RAM 211, and the remaining two chips form write RAM 213. The 8-bit chips store data, while the 1-bit chips store parity true or false information associated with each byte of data. Write RAM 213 is written to by the DMA channel or microprocessor 108 and stores data which will be written to the FIPS channel. Read RAM 211 is written to by the FIPS channel interface and stores FIPS bus in data. Both Write RAM 213 and Read RAM 211 can be read by either the PC system DMA channel 109 or microprocessor 108. Additionally, microprocessor 108 can directly read or write the FIPS interface data buses 115.

The FIPS data RAM address generator 711 is common to the Read and Write RAMchips 211, 213 and circuitry 716 is provided for on-the-fly data comparison between data residing in Write RAM 213 and data being stored in Read RAM 211 (during FIPS bus 115/117 read activity).

In addition to the FIPS data address generator 711 described above, the FIPS data RAM circuitry also includes a separate address generator 713 used for DMA access by PC 102 and microprocessor 108. Address generator 713 is automatically selected during DMA and microprocessor 108 transfers. At all other times, the FIPS data address generator 711 is selected.

While microprocessor 108 can directly access all FIPS data bus 115 and tag lines 117, the emulator digital signal control circuitry 118 is designed to handle Service In, Service Out, Command Out, Data In and Data Out tag lines during data transfers, without microprocessor 108 intervention. A plurality of programmable delay lines 714, 723 have been included which allow the user to program the delay between Service In and Service Out, and Data In and Data Out. Consider, for example, the Service In/Service Out tag line pair. When emulator 105 is placed in automatic handshake mode, digital signal control circuitry 118 will, upon sensing a Service In tag line rise, wait for the programmed delay time and then raise Service Out. Similarly, upon sensing the Service In line fall, digital signal control circuitry 118 will wait a specified delay time and then cause Service Out to fall. (Note that, in an exemplary embodiment, the delays for response to rise and response to fall are independently controlled and are programmable between 95 and 515 ns [nanoseconds] in 10 ns steps). If emulator 105 is placed in a manual handshake mode, however, digital signal control circuitry 118 will not generate any Service Out responses. The Data In/Data Out pair of tag lines works in a manner identical to that described for the Service In/Service Out pair. (Note that the delays for Data In/Data Out are independent of the delays for Service In/Service Out in the preferred embodiment). Finally, when the total byte count (of bytes to be transferred between emulator 105 and control unit 130 is reached, Command Out is substituted for Service Out/Data Out in response to Service In/Data In. The timings are exactly the same as would be the case for Service Out/Data Out. This substitution is for one byte only. Any further Service In/Data In signals are answered by Service Out/Data Out signals.

The timing from the rising edge of Service In or Data In tag lines 117 to the storing of data from the data bus in lines 115 is also under program control and can range from 95 to 215 ns in 20 ns steps in the preferred embodiment. Write strobe timing for data associated with Service In is independent of write strobe timing for data associated with a Data In signal.

When data transfer is complete, microprocessor 108 may be used to examine the data compare signal to determine the success of the transfer.

Data Transfer Scenario

To set up a data transfer, an initial starting address 521 (defining the location of the first read or write byte), a loop start address 522 and a loop end address 523 are initialized and a 32-bit counter 710 is loaded with the complement of the total number of bytes to be transferred. On each data read or write, the address generator 711 and total byte counter 710 are incremented. The address is monitored by reload address compare circuitry 712, and when the new address exceeds the reload address, address generator 711 is reloaded with the loop start address. This sequence continues until control unit 130 stops requesting data transfers, or until the total byte counter 710 overflows, indicating that the transfer is to be terminated by a given emulator 105. Thus, a unique data preamble can be followed by repeating data patterns for data transfers of up to 2 gigabytes (which is the maximum count of the byte counter in an exemplary embodiment).

Programmable Delays

In an exemplary embodiment, the signals listed in TABLE I below are programmable. The bit positions (Bit Nos.) defined below are located in blocks 714 and 723. In the table below, "SVC" stands for "service". Delays are set simultaneously by a 32-bit write by microprocessor 108.

TABLE I

| Bit No. | Controls | Max. Delay |
| --- | --- | --- |
| 0-2 | SVC In data store | 140ns |
| 3-5 | SVC Out fall. edge (fine) | 70ns |
| 6-8 | SVC Out fall. edge (coarse) | 350ns |
| 9-11 | SVC Out rising edge (fine) | 70ns |
| 12-14 | SVC Out rising edge (coarse) | 350ns |
| 15 | Not used | |
| 16-18 | Data In data store | 140ns |
| 19-21 | Data Out fall. edge (fine) | 70ns |
| 22-24 | Data Out fall. edge (coarse) | 350ns |
| 25-27 | Data Out rising edge (fine) | 70ns |
| 28-30 | Data Out rising edge (coarse) | 350ns |

FIPS Bus/Tag Trace RAM

In an exemplary embodiment, the bus/tag trace RAM section 214 of emulator 105 is made up of six 32K×8 bit RAM chips, a trace address generator 728, a trace timer 732 and a trace address buffer 729. All bus and tag lines 115, 117 are tied into the trace RAM 214 via buffers 730, 731. The status of these lines and trace timer 732 is stored whenever a tag line changes state while a trace operation is enabled. Address generator 728 is circular in nature, i.e., it will wrap from maximum count to zero. Digital signal control circuitry 118 includes a buffer 729 to allow PC system 102 to read the 15-bit trace buffer address directly.

Upon sensing a tag line change, the trace trigger 727 issues a write pulse to trace RAM 214 and increments trace buffer address generator 728.

Trace timer 732 is a 12-bit, non-overflowing up-counter which clocked by the system clock (not shown) and which is reset after each store into trace RAM 214. Thus, the time stored for each subsequent I/O event is the time since the last I/O event. Upon reaching a predefined maximum clock tick count (decimal 4094), timer 732 will maintain that count to prevent aliasing. With a system clock frequency of 18 MHz, the maximum count corresponds to 227 microseconds. Note that whenever an inter-emulator write occurs, trace RAM 214 stores the state of all lines and the current timer value, then stores the state of all lines with a timer value of 4095. This "bookmarking" feature is useful when one is attempting to correlate trace information from more than one emulator 105 during a multiple emulator test run. An inter-emulator write by one emulator 105 will be recorded in the traceRAM 214 of all interconnected emulators 105.

Trace RAM 214 can be read by supplying the desired starting address and executing a DMA read sequence. Since trace RAM 214 is 48 bits wide, it is broken into two groups. The first group comprises data corresponding to all tag lines 117 and the 12-bit timer 732. The second group comprises data corresponding to all data lines 115.

While a specific embodiment of this invention has been disclosed, it is expected that those skilled in the art can and will design alternate embodiments of this invention that fall within the scope of the appended claims.

We claim:

1. A test system for testing a data storage device control unit wherein said test system and said control unit transmit control signals and data therebetween, said test system comprising:
   a first emulator including:
   (a) a microprocessor;
   (b) RAM memory connected to said microprocessor;
   (c) signal control means operatively connected with said microprocessor for controlling the timing of said control signals and said data transmitted between said first emulator and said control unit; and
   (d) programmable timing means operatively connected with said signal control means for varying said timing between the receiving of said control signals transmitted from said control unit and the transmitting of said control signals from said first emulator to said control unit;
   wherein said first emulator performs said testing of said data storage device control unit.

2. The test system of claim 1, including programmable capture means operatively connected with said signal control means for storing said data received by said first emulator in said RAM memory; wherein the time interval between the receiving of said control signals transmitted from said control unit and the capturing of said data by said first emulator is programmably variable.

3. The test system of claim 1, including:
   (a) at least one additional emulator; and (b) inter-emulator communication means for communicating directly between said first emulator and said at least one additional emulator.

4. The test system of claim 1, further including:
(a) a control processor and N supplementary emulators, wherein said first emulator and each of said supplementary emulators is operatively interconnected to each other and to said control processor for intercommunication purposes; and
(b) inter-emulator communication means for communicating directly between said first emulator and each of said supplementary emulators.

5. The test system of claim 4, further including means for programming said first emulator and said supplementary emulators in order to test said control unit.

6. The test system of claim 3, further including means for synchronizing said first emulator with said at least one additional emulator so as to cause certain of said control signals and certain of said data to be transmitted simultaneously by said first emulator and said at least one additional emulator to said control unit.

7. The test system of claim 3, further including bookmarking means for recording a plurality of data signatures in each of said first emulator's RAM memory and said at least one additional emulator's RAM memory, wherein each of said plurality of data signatures is indicative of an inter-emulator read/write operation and wherein said bookmarking means provides the ability to timewise analyze said data recorded in each of said first emulator's RAM memory and said at least one additional emulator's RAM memory in said test system.

8. The test system of claim 1, including event-driven means for initiating said storing of said data received from said control unit in said RAM memory, and wherein said storing of said data is performed in response to programmably determined signal events which occur timewise relative to said control signals received from said control unit.

9. The test system of claim 1, including means for real-time comparison of said data received from said control unit by said test system and data expected to be received by said test system from said control unit.

10. The test system of claim 1, including data pattern looping means for outputting a stored data pattern to said control unit N times, and wherein said data pattern and the value of N are user-programmable.

11. The test system of claim 1, including data pattern looping means for generating an initial data sequence and a data pattern, wherein:
(a) said initial data sequence is output to said control unit one time;
(b) said data pattern is output to said control unit up to N times; and
(c) said initial data sequence, said data pattern, and the value of N are user-programmable.

12. A test system for testing a data storage device control unit wherein said test system and said control unit transmit control signals and data therebetween, said test system comprising:
(a) RAM memory;
(b) signal control means operatively connected with said RAM memory for controlling the timing of said control signals and said data transmitted between said test system and said control unit; and
(c) event-driven means for initiating storing of said data received from said control unit in said RAM memory, wherein said storing of said data is performed in response to programmably determined events which occur with respect to said control signals received from said control unit;
wherein said testing of said data storage device control unit is performed by said signal control means and said event-driven means.

13. A test system for testing a data storage device control unit wherein said test system and said control unit transmit control signals and data therebetween, said test system comprising:
a first emulator including:
(a) a microprocessor;
(b) RAM memory connected to said microprocessor;
(c) signal control means operatively connected with said microprocessor for controlling the timing of said control signals and said data transmitted between said first emulator and said control unit; and
(d) programmable capture means operatively connected with said signal control means for storing said data received by said first emulator in said RAM memory, wherein the time interval between the receiving of said control signals transmitted from said control unit and the capturing of said data by said first emulator is programmably variable;,
wherein said testing of said data storage device control unit is performed by said first emulator.

14. A test system for testing a data storage device control unit wherein said test system and said control unit transmit control signals and data therebetween, said test system comprising:
(a) at least one channel emulator for emulating a channel interface between a host processor and said control unit;
(b) signal control means for controlling the timing of said control signals and said data transmitted between said at least one channel emulator and said control unit; and
(c) data comparison means for comparing in real-time said data transmitted by said test system to said control unit with said data received from said at least one control unit by said test system;
wherein said testing of said data storage device control unit is performed by said signal control means and said data comparison means.

15. A test system for testing a data storage device control unit wherein said test system and said data storage device control unit transmit control signals and data therebetween, said test system comprising:
(a) signal control means for controlling the timing of said control signals and said data transmitted between said test system and said control unit; and
(b) data pattern looping means for generating a data pattern N times, and wherein said data pattern and the value of N are user-programmable;
wherein said testing of said data storage device control unit is performed by said signal control means and said data pattern looping means.

16. A method for testing a data storage device control unit wherein a test system and said control unit transmit control signals and data therebetween via a channel interface, and wherein said test system comprises at least one channel interface emulator operatively connected with said control unit, said method comprising the steps of:
(a) programmably varying the timing between the receiving of said control signals transmitted from said control unit and the transmitting of said control signals from said emulator to said control unit; and (b) capturing said data received by said emulator, wherein the time interval between the receiving of said control signals transmitted from said control unit and the capturing of said data by said at least one channel interface emulator is programmably variable:

wherein said steps (a) and (b) are performed to test said data storage device control unit.

17. In a test system comprising a first channel interface emulator including a microprocessor having RAM memory, and wherein data and control signals are transmitted between said test system and a data storage device control unit, a method for testing said data storage device control unit comprising the steps of:

(a) varying said timing between the receiving of said control signals transmitted from said control unit and the transmitting of said control signals from said first channel interface emulator to said control unit; and (b) capturing said data received by said first channel interface emulator from said control unit in a manner wherein the time interval between the receiving of said data transmitted from said control unit and the capturing of said data in said RAM memory is timewise variable with respect to the receiving of said control signals; wherein said steps (a) and (b) are performed to test said data storage device control unit.

18. The method of claim 17, further including the step of:

operatively connecting N supplementary channel interface emulators with one another and also to said first channel interface emulator, wherein each of said supplementary channel interface emulators have RAM memory.

19. The method of claim 18, further including the step of:

synchronizing said first channel interface emulator with said at least one of said supplementary emulators to cause certain of said control signals and certain of said data to be transmitted simultaneously by said first channel interface emulator and said at least one of said supplementary channel interface emulators to said control unit.

20. The method of claim 18, further including the step of:

recording a plurality of data signatures in each of said first channel interface emulator's and said supplementary channel interface emulators' said RAM memory, each of said plurality of data signatures being indicative of a read/write operation between any of said first and said supplementary channel interface emulators in order to provide cross-correlation of said data signatures.

21. The method of claim 18, further including the step of:

initiating said capturing of said data received by any of said first and said supplementary channel interface emulators from said control unit, wherein said capturing of said data is performed in response to programmably determined events which occur with respect to said control signals received from said control unit.

22. The method of claim 17, further including the steps of:

(a) comparing in real-time said data transmitted to said control unit with said data received from said control unit; and (b) optionally halting the operation of said channel interface emulator upon detection of a mis-compare between said data transmitted to said control unit and said data received from said control unit.

23. The method of claim 17, further including:

generating an initial data sequence and a data pattern, wherein said data pattern is repeated up to N times, and where said initial data sequence, said data pattern, and the value of N are user-programmable.

* * * * *